July 8, 1924.
D. K. LIPPINCOTT
ELECTRIC CIRCUIT PROTECTIVE DEVICE
Filed Dec. 9, 1919
1,501,019
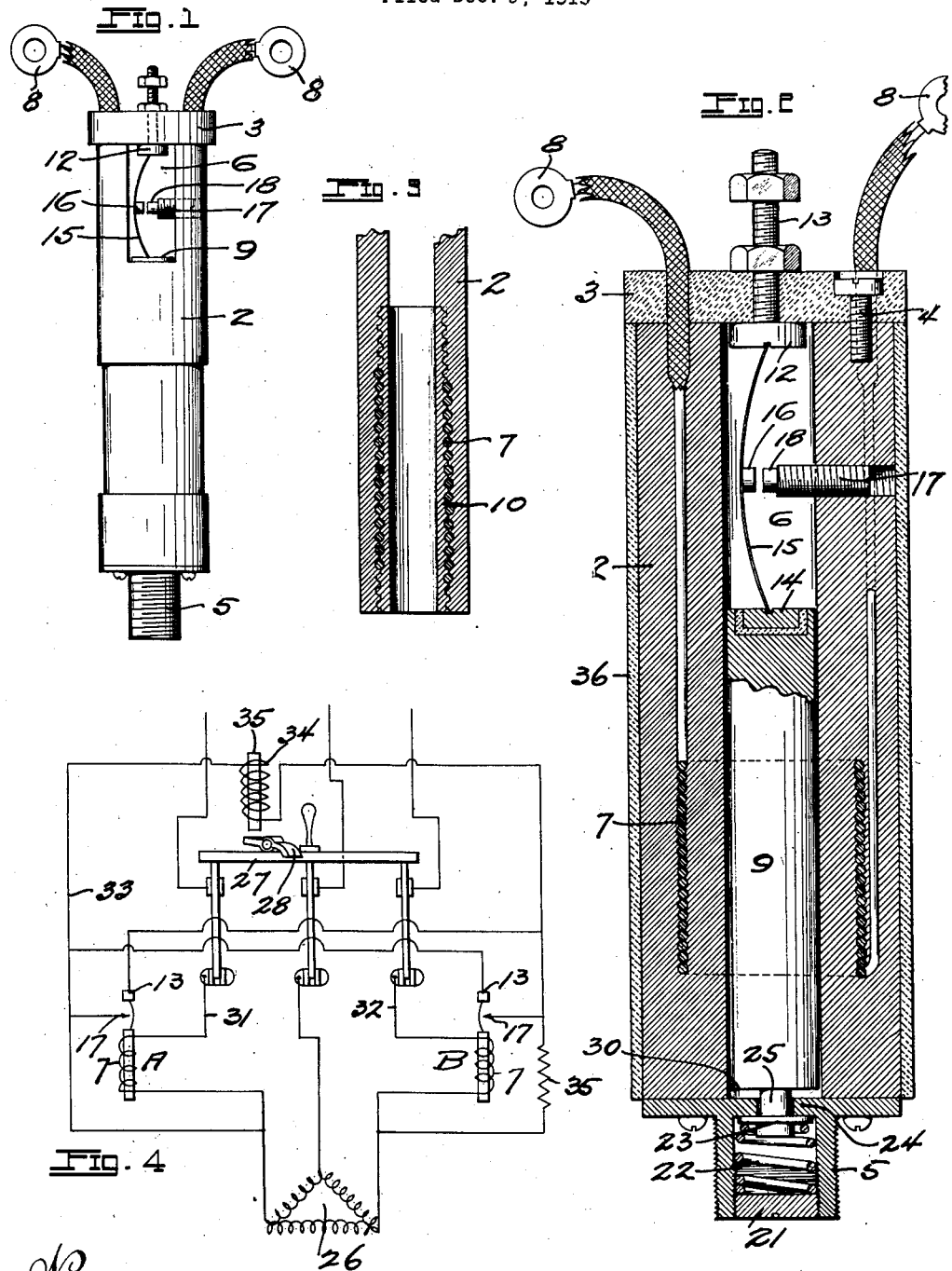
INVENTOR
DONALD K. LIPPINCOTT.
BY White Prost
his ATTORNEYS

Patented July 8, 1924.

1,501,019

UNITED STATES PATENT OFFICE.

DONALD K. LIPPINCOTT, OF SAN FRANCISCO, CALIFORNIA, ASSIGNOR, BY MESNE ASSIGNMENTS, TO GENERAL ELECTRIC COMPANY, A CORPORATION OF NEW YORK.

ELECTRIC-CIRCUIT PROTECTIVE DEVICE.

Application filed December 9, 1919. Serial No. 343,483.

*To all whom it may concern:*

Be it known that I, DONALD K. LIPPINCOTT, a citizen of the United States, and a resident of the city and county of San Francisco, State of California, have invented certain new and useful Electric-Circuit Protective Devices, of which the following is a specification.

The invention relates to devices for interrupting an electrical circuit containing electrical apparatus when the temperature of the apparatus approaches a dangerous value and particularly to relays which are operated to actuate tripping devices for opening the circuit when the dangerous temperature is approached.

The devices of my invention are operated by an increase in temperature to or above a predetermined temperature, to actuate tripping devices, either mechanically or electrically, to open an electric circuit.

An object of the invention is to provide a device in which the temperature of the electrical apparatus, whether it be a motor, a transformer or other apparatus, is faithfully reproduced, so that any condition or series of conditions of current flow which will produce a dangerous temperature in the apparatus, will in the same time, produce in the device a temperature which will cause it to operate to interrupt the circuit.

Another object of the invention is to provide a device the heating curve of which follows the heating curve of the apparatus being protected and which can be constructed to follow the mean heating curve or the hot spot heating curve of the apparatus.

A further object of the invention is to provide a device which will operate under short circuit conditions to immediately interrupt the circuit.

A further object of the invention is to provide a device which provides protection against short circuiting conditions in the apparatus and at the same time provides the thermal protection and which follows the heat curve of the hot spot of the apparatus.

The invention possesses other advantageous features, some of which with the foregoing, will be set forth at length in the following description, where I shall outline in full, that form of the invention which I have selected for illustration in the drawings accompanying and forming part of the present specification. In said drawings I have shown one specific form of the protective device of my invention, but it is to be understood that I do not limit myself to such form, since the invention, as expressed in the claims, may be embodied in a plurality of forms.

The protective device of my invention, when operating, that is, when current is flowing in the circuit, is preferably substantially synthermal with the hot spot in the apparatus being protected. Since the device and apparatus are synthermal or substantially so, a dangerous temperature in the apparatus will be accompanied by a corresponding temperature in the device, and this temperature will cause the device to be actuated to open the circuit, thereby precluding any further current flow. By a dangerous temperature, I do not mean a destructive temperature, but rather, any temperature beyond which the continued safe operation of the apparatus is not assured. By virtue of this synthermal relationship which obtains at all times during the operation of the apparatus, it is possible to operate the apparatus on overloads of large or small magnitude, with the assurance that the apparatus will carry the overload for the maximum possible period and that the circuit will be interrupted in advance of the production of a dangerous temperature in the apparatus. This permits the operator to operate his apparatus at its maximum capacity, without fear of burnouts and the consequent cost of idle equipment and repairs.

I have found that three factors enter into the equation which determines the temperature produced in electrical apparatus, these factors being, heat generation, heat storage and heat emission, and these three factors must be of the same relative magnitude to produce the synthermal relation. Heat is generated by the flow of current through a resistance, heat is stored in any material whose temperature is raised, the magnitude of the storage capacity being represented by the product of the mass and the specific heat of the material, and heat is emitted by conduction, convection and radiation. When the temperature of a particular spot in the apparatus being protected is considered, in contradistinction to the mean temperature, a fourth factor must be taken into account, i. e., the flow of heat between the different parts of the device. The rate of heat emission may be regulated by varying surface dimensions and by the use of heat insulation materials. The apparatus being protected, whether, it be a motor, a transformer or other apparatus, contains material which possesses heat storage capacity and to produce a synthermal or substantially synthermal protective device, provision must be made in the device for heat storage.

The temperature of a body heated uniformly throughout its mass at a uniform rate may be expressed quite accurately by the expression $$Te = T(1-e^{-kt})$$

where $Te$ is the temperature at any instant; $T$ the temperature of equilibrium, reached theoretically only after infinite time, but approached closely in a comparatively short period; $t$ is the time during which heating has been taking place; $e$ is the base of the natural logarithms and $k$ is a constant, based upon the ratio of the heat capacity of the body in question to its heat emission and depending numerically upon the units involved in the expression. If the heat is developed in a certain limited portion of the body and is carried to the remainder of the mass by conduction, the expression for the temperature of the hot spot becomes a very complex expression, the exact mathematical treatment of which is very difficult. Under this condition $k$ is no longer a constant, but varies with the time, i. e. as the heat is carried throughout the mass, the proportion of heat stored to heat emitted is increased. If it be assumed that this increase is proportional to some power of the time I obtain the equation $$Te = T(1-e^{-at^n})$$

which expresses the curve of the hot spot of an electric motor with as great an accuracy as it can be measured by ordinary methods. In this equation $n$ is a fraction which is greater than 0.5 and less than 1; its value for the ordinary induction motor being about 0.7. It is the magnitude of this exponent $n$ which determines the shape of the heating curve as distinguished from its magnitude. In the device of my invention, it is possible, by proper proportioning and selection of materials to vary $n$ within wide limits thereby permitting the device to be constructed to be responsive to the temperature of the apparatus as a whole; to the temperature of the windings or to the temperature of some selected portion of the windings, whichever may be most suitable to the service for which the device is designed.

The device of my invention, which I have termed a thermal relay, comprises a heating element, a heat storage element or heat ballast, a thermal responsive element, which in the present instance also serves as the heat storage element and means responsive to the thermal responsive element which functions to cause interruption of the electric circuit. The ballast receives its heat preferably by conduction, from the heating element, and I have so arranged the ballast with relation to the heating element, that the mean temperature integrated longitudinally to which the ballast, (in this instance also the thermal responsive element) is subjected corresponds directly with or is the same as the temperature which is produced in the hottest part of the destructible portion of the apparatus, for instance, the temperature which is produced in the hottest part of the windings of a motor or transformer. The thermal relay is ordinarily employed in connection with a switch and operates to actuate a tripping circuit, to cause the switch to open, thereby precluding any further temperature rise of the apparatus.

In the accompanying drawings Figure 1 is an elevation of one form of relay embodying my invention.

Figure 2 is a vertical section through the relay shown in Figure 1 on a larger scale.

Figure 3 is a vertical section through the relay showing a preferred form of construction.

Figure 4 is a diagrammatic representation of a three phase electric circuit equipped with the relays of my invention and showing one form of switch tripping circuit. It is not essential that the relays be connected through the specific tripping circuit shown, since any other or known form of tripping circuit may be employed.

As I have stated before, the device of my invention not only operates to interrupt the circuit when a dangerous temperature is approached in the apparatus due to short heavy overloads or long continued small overloads or combinations thereof, but acts to immediately open the circuit upon the presence of an abnormal excess of current in the circuit, such as may be produced by short circuit conditions in the apparatus, improper connections or other causes.

The relay shown in the drawings comprises a body or mass 2 of heat storage material having a fairly high thermal conductivity and a large coefficient of expansion, such as lead or zinc. It is of advantage to make this body 2 either of pure metal or of an alloy which solidifies in the form of a solid solution. In those alloys in which the materials crystallize out separately, the coefficient of expansion appears to change with repeated heating and cooling, and altho this can be partly overcome by prolonged heating, when extreme accuracy is desired, the homogeneous material gives more satisfactory results. The body 2 is preferably cylindrical in form and is secured at its upper end to a cap 3 of insulating material, such as bakelite by suitable means such as the screws 4. The device is preferably supported in a dependent position by engagement of the cap with a suitable support, but may be supported from the lower end when desired. Secured to the lower end of the body is a cap 5, which may be provided with an external thread adapted to be secured into a supporting socket.

The body 2 is provided with a transverse slot or opening 6 at its upper portion and below the slot is formed with a cylindrical bore, so that the lower or main portion of the body is annular in shape. Disposed within the annular portion of the body is a heating coil 7, which is preferably coaxial with the body and disposed at approximately the radial center of mass of the heat storage element. The heating coil or heating element is preferably formed of copper wire covered with suitable insulation which ordinarily may be ordinary cotton insulation although other forms of insulation, such as enamel may be employed when high temperatures are to be encountered. The coil is formed and the body 2 is cast around the coil, so that the body makes a tight and very close thermal contact with the coil, so that heat conduction between the two elements is raised to its possible maximum.

In practice I prefer to wind the heating coil on a threaded spacing core 10 which is then spaced in a mold and the body 2 cast around it. The core 10 produces the proper spacing of the turns of the coil and insures the proper positioning of the coil in the body. The core is of the same material as the body and when the molten metal is poured into the mold, unites with the poured metal, forming a functionally integral body. The body is cast in chills so that the heat of the metal is rapidly conducted therefrom and under these circumstances I have found that plain cotton insulation on the wire of the heating coil was not charred or in any manner altered. The ends of the heating coil are brought out through the cap 3 and are provided with suitable terminals 8 for connection in the electric circuit. The metal of the body has a large coefficient of expansion so that variations in temperature of the body produce variations in the length thereof, i. e., variations in the distance between the caps 3 and 5.

Disposed in the bore formed within the annular body and preferably freely movable with respect to the body, is a bar or rod 9, of material having a low coefficient of expansion, such as nickel steel. For reasons which will become apparent hereinafter, this rod 9 is made of magnetic material, and nickel steel meets this requirement. The rod 9 is supported at its lower end from or by the cap 5 and since its coefficient of expansion is low in comparision with the coefficient of expansion of the metal of the body 2, the variation in length of the body due to temperature changes is manifested between the cap 3 and the upper end of the rod 9 that is, the upper end of the rod 9 moves substantially coincidently and equally with the lower end of the body. The rod 9 is free from the body 2, but is in close thermal contact therewith, so that the rod also acts as a heat storage element. The heat storage element is therefore a composite structure consisting of the body 2 and the rod 9.

Secured to the cap 3 and lying within the slot 6 in the body 2 is a contact head 12, formed integral with the binding post 13. The head 12 forms an upper spring seat. Secured to and insulated from the upper end of the rod 9 is a lower spring seat 14. Arranged between and engaging the two spring seats is a thin metallic flat spring 15 to which is secured a contact 16. In the construction illustrated, the spring is normally bowed and is straightened out by an increase in temperature of the body. Extending transversely through the body 2 and into the slot 6, is a contact screw 17, carrying a contact 18 which is engaged by the contact 16 when the temperature of the body reaches a predetermined value. The screw 17 is adjustable in the plane of movement of the spring, but ordinarily it is set and fixed when the device is rated. In this construction the contacts are normally out of engagement and are brought into contact by a rise in temperature to a predeterminal value, but the screw may be arranged on the other side of the spring so that the contacts are normally in engagement and are separated by the rise in temperature.

The device, as thus far described, is a thermal relay and when short circuiting protection is not desired, it may be built as heretofore described. The device as shown in the drawings however, also offers short circuiting protection. Arranged within the cap 5 and bearing against the adjusting screw 21 is a spring 22, which bears at its upper end against the spring plate 23, which is held against further vertical movement by the internal annular shoulder 24 on the cap 5. The rod 9, which I have stated is formed of magnetic material, is provided on its lower end with a neck 25 which extends through the aperture in the shoulder 24 and rests against the plate 23. The rod 9 is therefore held in raised position by the spring 22 and may be depressed a limited distance, the distance being limited by the spacing between the shoulder 24 and the lower end 30 of the rod. The heating coil 7 is so disposed with relation to the rod 9, that the flux produced by the flow of current through the heating coil exerts a downward pull on the rod 9. The spring 22 opposes this pull and is so adjusted, that the rod is pulled down against the action of the spring, when a predetermined abnormal current flows through the heating coil. Consequently an abnormal current, such as is produced by short circuit conditions in the apparatus, will immediately cause the rod to be depressed, bringing the contacts 16 and 18 into engagement.

The device of my invention may be employed with any suitable form of tripping circuit, so that the engagement of the contacts operates to throw the tripping device into operation. In the present instance I have shown the devices of my invention installed in a three phase three wire circuit connected to the motor 26, which is the apparatus to be protected. The circuit is provided with a three blade switch 27 which is held in the closed position by a latch 28. The switch is provided with a suitable opening spring (not shown) for opening the switch when the latch is released. Two devices A and B of my invention are arranged in the two outer legs 31—32 of the circuit, with the heating coils 7 in series in the legs, so that the current in the circuit flows through the heating coils, and these devices are preferably placed on the motor side of the switch. Connected across the legs 31—32 of the circuit between the motor and the switch is a circuit 33, containing a solenoid 34, which in this instance is a low voltage coil. The plunger 35 in the solenoid is arranged in operative position with respect to the latch 28, so that upon a reduction of line voltage to a predetermined value, the solenoid drops, opens the latch and releases the switch. In this arrangement, the devices are arranged, so that engagement of the contacts 16 and 18, short circuits the low voltage coil 34, releasing the plunger and permitting the switch to open. The binding post 13 of the device A is connected to the circuit 33 on the opposite side of the coil 34 from the leg 31 and the binding post 13 of the device B is connected to the circuit 33 on the opposite side of the coil 34 from the leg 32. The contact screw 17 is embedded in and consequently electrically connected to the body 2 and the screw 17 of the device A is connected directly or mediately through the body with the adjacent leg of the circuit 33 and the screw 17 of the device B is connected to the adjacent leg of the circuit 33. The contacts 16 and 18 in each device are therefore connected to the circuit 33 on opposite sides of the solenoid 34, so that when the contacts of either device move into engagement with each other, the solenoid is short circuited and the switch opened. The opening of the switch disconnects the motor and the devices from the supply circuit, so that there is no current at the contacts when they subsequently separate, due to the cooling of the body. A resistor 35 is arranged in the circuit 33 to limit the current through the contacts of the device.

It is understood that the devices of my invention are not limited in use to the tripping circuit shown, but may be employed in connection with any sutable circuit or device, for opening the electric circuit. The present circuit incorporates the advantages of a low voltage release, which is desirable, and for that reason I have shown such circuit. The devices may also be constructed, as set forth hereinbefore, to open or close a tripping circuit as a dangerous temperature is approached.

There are several methods of constructing the device so that it will follow any desired form of hot spot curve or other desired curve or form, such as varying the construction of the device or relation of the parts so that a heat flow is not accompanied by as large an increase in heat emission as in heat storage. This may be accomplished by decreasing the diameter of the body 2 immediately surrounding the heating coil as shown in Figure 1 or by surrounding the body with a tube 36 of some material, the ratio of the specific heat of which to its thermal conductivity differs from that of the body 2. Such tube may be composed of pressed fiber or paper.

Many methods, such as providing radiating fins for a portion of the body or surrounding a portion of the body with heat insulating material, may be employed to vary the value of $n$ in the above equation to any desired extent or to follow equations of even more complex form. The rate of heat generation, heat emission, conduction, specific heat and hence heat storage, are separately variable, so that any desired result may be obtained.

I claim:

1. A protective device for an electric circuit containing electrical apparatus, comprising a metallic thermal responsive device of large mass and a heating element adapted to be placed in circuit with the apparatus embedded in said mass.

2. A protective device for an electric circuit containing electrical apparatus, comprising a heat storage element formed in two parts having different coefficients of expansion, means operative by an increase in temperature of said element to a predetermined temperature, to perform a controlling function, and a heating element adapted to be placed in circuit with the apparatus disposed in thermal communication with said heat storage element.

3. A protective device for an electric circuit containing electrical apparatus, comprising a heat storage element formed in two parts having different coefficients of expansion, means operative by an increase in temperature of said element to a predetermined temperature, to perform a controlling function, and a heating element embedded in said heat storage element adapted to be placed in circuit with the apparatus.

4. A protective device for an electric circuit containing electrical apparatus, comprising a metallic heat storage element, a heating coil embedded in said element, a rod having a different coefficient of expansion than said element arranged within said element and means operative by different variations in length of said element and rod due to a rise in temperature, to a predetermined temperature, to perform a controlling function.

5. A protective device for an electric circuit containing electrical apparatus, comprising a heating coil adapted to be placed in circuit with the apparatus, a metallic heat storage element in which said coil is embedded, and means operative by variation in size of said element due to an increase in temperature to a given temperature, to control the circuit with which the device is associated.

6. A protective device for an electric circuit containing electrical apparatus, comprising a heating coil adapted to be placed in circuit with said apparatus, a heat storage element in which said coil is embedded, means operative by variations in temperature of said heat storage element for controlling the circuit with which the device is associated and means operative by the magnetic effect of current in the coil for controlling said circuit.

7. A protective device for an electric circuit containing electrical apparatus, comprising a heat storage element, a heating coil adapted to be placed in circuit with the apparatus and embedded in said element, means operative by variations in temperature of said heat storage element for controlling the circuit with which the device is associated, a movable body within said element subjected to the magnetic field of said coil, and means operative by the movement of the body with respect to the element for controlling said circuit.

8. A protective device for an electric circuit containing electrical apparatus, comprising a cylindrical metallic body closed at its lower end, a heating coil embedded in said body, a rod of less length than the body disposed within the body and resting against the lower end thereof, the coefficient of expansion of the rod being other than that of the body, so that variations in temperature of the body vary the distance between the upper end of the body and the upper end of the rod, and means actuated by such variation in distance adapted to control the circuit.

9. A protective device for an electric circuit containing electrical apparatus, comprising a cylindrical metallic body closed at its lower end, a heating coil embedded in said body, a rod of less length than the body disposed within the body and resting against the lower end thereof, the coefficient of expansion of the rod being other than that of the body, so that variations in temperature of the body vary the distance between the upper end of the body and the upper end of the rod, a flat spring interposed between the upper end of the body and the upper end of the rod, a contact carried by said spring, and a contact carried by said body normally out of contact with said first mentioned contact, said contact adapted to be closed at a predetermined temperature.

10. A protective device for an electric circuit containing electrical apparatus, comprising a cylindrical metallic body closed at its lower end, a heating coil embedded in said body, a rod of less length than the body disposed within the body and resting against the lower end thereof, the coefficient of expansion of the rod being other than that of the body, so that variations in temperature of the body vary the distance between the upper end of the body and the upper end of the rod, a spring interposed between the upper end of the body and the upper end of the rod, a contact on said spring, a fixed contact adapted to be engaged by said spring contact and an electric control circuit connected to said contacts.

11. A protective device for an electric circuit containing electrical apparatus, comprising a cylindrical metallic body closed at its lower end, a heating coil embedded in said body, a rod of less length than the body disposed within the body and resting against the lower end thereof, the coefficient of expansion of the rod being other than that of the body, so that variations in temperature of the body vary the distance between the upper end of the body and the upper end of the rod, a spring interposed between the upper end of the body and the upper end of the rod, a contact on said spring, a screw engaging in said body, a contact on said screw adapted to be engaged by said spring contact and an electric control circuit connected to said contacts.

12. A protective device for an electric circuit containing electrical apparatus, comprising a cylindrical metallic body closed at its lower end, a heating coil embedded in said body, a rod of less length than the body disposed within the body and resting against the lower end thereof, the coefficient of expansion of the rod being other than that of the body, so that variations in temperature of the body vary the distance between the upper end of the body and the upper end of the rod, a spring interposed between the upper end of the body and the upper end of the rod and insulated from said body and rod and means actuated by movement of the spring adapted to open the electric circuit.

13. A protective device for an electric circuit containing electrical apparatus, comprising a thermal responsive device having a large heat storage capacity, a heating element embedded in said thermal responsive device and means actuated by the thermal responsive device adapted to open the electric circuit.

14. A protective device for an electric circuit containing electrical apparatus, comprising an annular metallic body, a heating coil embedded in said body, a cap secured to the upper end of said body, a cap secured to the lower end of said body, a rod of less length than said body disposed therein and supported by the lower cap, said rod having a different coefficient of expansion than the body, a bowed spring interposed between the upper cap and the upper end of the rod, a contact carried by said spring, and a contact carried by said body and adapted to be engaged on movement of the spring by said first contact to perform a controlling function with respect to the circuit with which the device is associated.

15. A protective device for an electric circuit containing electrical apparatus, comprising a thermal responsive device consisting of two metallic elements having different coefficients of expansion, one of said elements being of magnetic material, a heating coil adapted to be placed in circuit with the apparatus embedded in one element and surrounding the other element and so placed that the magnetic field of the coil exerts a pull on said magnetic element, and means operative by a movement of the end of the magnetic element for performing a controlling function with respect to the circuit with which the device is associated.

16. A protective device for an electric circuit containing electrical apparatus, comprising a thermal responsive device having a large heat storage capacity, a heating coil embedded in said thermal responsive device, means operative by variations in temperature of said thermal responsive device for opening said circuit, and means operative by the magnetic effect of the current in the coil performing a controlling function with respect to the circuit with which the device is associated.

17. A protective device for an electric circuit containing electrical apparatus, comprising a thermal responsive device having a large heat storage capacity, a heating coil embedded in said thermal responsive device, and means operative by an increase in temperature of said device to a predetermined temperature to control the circuit with which the device is associated and by an increase in the magnetic flux of said coil to a predetermined value to control the circuit with which the device is associated.

18. A protective device for an electric circuit containing electrical apparatus, comprising an annular metallic mass, a heating coil adapted to be placed in circuit with the apparatus embedded in said mass, a magnetizable plunger having a different coefficient of expansion than said mass disposed within the chamber at the center of said annular mass, the magnetic center of said plunger being spaced longitudinally from the magnetic center of said coil, a spring supporting said plunger and means operative by the movement of the upper end of the plunger for controlling the circuit with which the device is associated.

19. A protective device for an electric circuit containing electrical apparatus, comprising an annular metallic mass, a heating coil adapted to be placed in circuit with the apparatus embedded in said mass, a magnetizable plunger having a different coefficient of expansion than said mass disposed within the chamber at the center of said annular mass, the magnetic center of said plunger being spaced longitudinally from the magnetic center of said coil, a cap secured to the lower end of said mass, a spring in said cap on which said plunger rests, means for limiting the movement of the plunger and means operated by the movement of the plunger for controlling the circuit with which the device is associated.

20. A protective device for an electric circuit containing electrical apparatus, comprising an annular metallic mass, a heating coil adapted to be placed in circuit with the apparatus embedded in said mass, a magnetizable plunger having a different coefficient of expansion than said mass disposed within the chamber at the center of said annular mass, the magnetic center of said plunger being spaced longitudinally from the magnetic center of said coil, a cap secured to the lower end of the mass, a spring in said cap against which the plunger bears, means for varying the compression of said spring, and means operated by the movement of the plunger for controlling the circuit with which the device is associated.

21. A protective device for an electric circuit containing electrical apparatus, comprising an annular metallic mass, a heating coil adapted to be placed in circuit with the apparatus embedded in said mass, a magnetizable plunger having a different coefficient of expansion than said mass disposed within the chamber at the center of said annular mass, the magnetic center of said plunger being spaced longitudinally from the magnetic center of said coil, a cap secured to the lower end of the mass, a spring in said cap against which said plunger bears, a flat spring interposed between the top of the plunger and the top of the mass, the degree of flexure of which is varied by movement of the top of the plunger with respect to the top of the mass, and means operative by the movement of the flat spring for controlling the circuit with which the device is associated.

22. A thermostatic device comprising an annular metallic body, a rod having a different coefficient of expansion than the body arranged within the body and supported therein at its lower end and an electric heating element embedded in said body.

23. A thermostatic device comprising an annular body of substantially pure metal having a large coefficient of expansion, a rod disposed within said body and supported therein at its lower end and having a small coefficient of expansion and an electric heating element embedded in said body.

24. A protective device for an electric circuit containing electrical apparatus, comprising a thermal responsive device, a heating coil adapted to be placed in circuit with the apparatus and in close thermal communication with said device, said device and heating coil being proportioned so that they follow the heat curve of the apparatus, means operative by an increase in temperature of said device to a predetermined temperature to open the circuit, and means operative by an increase in the magnetic flux of said coil to a predetermined value to control the circuit with which the device is associated.

In testimony whereof, I have hereunto set my hand at San Francisco, California, this 2nd day of December, 1919.

DONALD K. LIPPINCOTT.

In presence of—
H. G. PROST.